United States Patent [19]

Kuwahara et al.

[11] Patent Number: 4,835,773
[45] Date of Patent: May 30, 1989

[54] DUPLICATED EQUIPMENT

[75] Inventors: Hiroshi Kuwahara, Kodaira; Masaru Shibukawa, Chofu; Yuji Izumita, Yokosuka, all of Japan

[73] Assignees: Hitachi Ltd.; Hitachi VLSi Engineering Corp., both of Tokyo, Japan

[21] Appl. No.: 920,608

[22] Filed: Oct. 20, 1986

[30] Foreign Application Priority Data

Oct. 21, 1985 [JP] Japan .................................. 60-233294

[51] Int. Cl.4 .............................................. G06F 11/20
[52] U.S. Cl. ........................................................ 371/8
[58] Field of Search ............................... 371/8, 9, 11, 7; 364/187, 200 MS File, 900 MS File, 132

[56] References Cited

U.S. PATENT DOCUMENTS 4,437,154  3/1984  Eisele .................................. 371/9 X
4,542,506  9/1985  Oe ........................................ 371/9
4,623,883  11/1986  Konen ................................. 371/9 X
4,700,348  10/1987  Ise ......................................... 371/8

Primary Examiner—Charles E. Atkinson
Assistant Examiner—Robert W. Beausoliel
Attorney, Agent, or Firm—Antonelli, Terry & Wands

[57] ABSTRACT

In duplicated equipment including main equipment, duplicated subordinate equipment, and a communication line for transferring data between the main equipment and the duplicated subordinate equipment and for sending a changeover signal which can put one and the other of a pair of subordinate devices making up the duplicated subordinate equipment in an active state and a standby state, respectively, from the main equipment to the duplicated subordinate equipment, each of the subordinate devices includes means for putting the other subordinate device in the standby state, to prevent both of the subordinate devices from being put in the active state when a failure occurs on a transmission path between the communication line and one of the subordinate devices.

5 Claims, 3 Drawing Sheets

DUPLICATED EQUIPMENT

BACKGROUND OF THE INVENTION

The present invention relates to a duplicated equipment, and more particularly to a duplicated equipment used for a time division exchange or other operations to improve the reliability thereof, in which subordinate equipment is composed of a pair of subordinate devices used as an active device and a standby device, and each of the subordinate devices is changed from an active state to a standby state or from the standby state to the active state in accordance with a changeover signal from main equipment.

A signal processor such as a time division exchange is made up of a main equipment (for example, a call processor such as a speech path controller) and a subordinate equipment (for example, a terminal controller). In order to improve the reliability of the signal processor and to ensure the stable operation thereof, the subordinate equipment includes a pair of subordinate devices used as an active device and a standby device, and the standby device is operated instead of the active device immediately after the active device becomes inoperative. Further, data is transferred between the main equipment and the subordinate equipment, and an active-state/standby-state changeover signal is sent from the main equipment to the subordinate equipment.

In such duplicated equipment, an exclusive line for sending the active-state/standby-state changeover signal from the main equipment to the subordinate equipment is usually separated from a communication line (that is, a data highway) for transferring information between the main equipment and the subordinate equipment.

Further, a transmission system has been known in which a transmission line for the above changeover signal and the data highway are unified. (Refer to Japanese Patent Application JP-A-No. 59-163652). However, this transmission system has the following drawback. That is, when the automonous switching functions of signals transmitted between the main equipment and the subordinate equipment are lost as a result of a failure, it is impossible to perform a changeover operation for the subordinate equipment under the control of the main equipment. In a case where the active- state/standby-state changeover signal is sent from the main equipment to the duplicated subordinate equipment through the data highway (namely, the communication line) to reduce the number of transmission lines, if trouble occurs between the subordinate equipment and the data highway, it will become impossible to perform a changeover operation for the subordinate equipment, and thus the communication system composed of the main equipment and the subordinate equipment will not be able to operate normally, notwithstanding the main equipment and the subordinate equipment are both kept at an normal state.

SUMMARY OF THE INVENTION

A main object of the present invention is to provide duplicated equipment which can send an active-state/standby-state changeover signal from main equipment to duplicated subordinate equipment through a communication line provided therebetween, and which includes means for normally operating the duplicated equipment as a whole, even when a transmission path between the communication line and an active one of a pair of subordinate devices making up the duplicated subordinate equipment is cut by a failure.

In order to attain the above object, according to the present invention, there is provided duplicated equipment in which a transmission line for sending an active-state/standby-state changeover signal to duplicated subordinate equipment, and a communication line are unified, and each of a pair of subordinate devices making up the duplicated subordinate equipment includes means for putting the other subordinate device in a standby state.

In such duplicated equipment, the active-state/standby-state changeover signal is transmitted through the communication line for data transfer, and thus the number of transmission lines between the main equipment and the subordinate equipment is reduced. Further, when a failure occurs on a transmission line between the communication line and an active subordinate device, a standby subordinate device can be put in an active state by the changeover signal from the main equipment. At this time, the active device is automatically put in a standby state. Thus, it can be prevented to put the two subordinate devices simultaneously in the active state.

The above and other objects and features of the present invention will become more apparent by reference to the following description taken in conjunction with the accompanying drawings.

DESCRIPTION OF THE PREFERRED EMBODIMENTS

Figure 1:
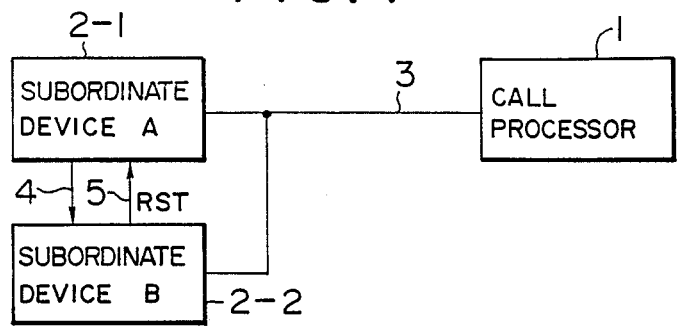
FIG. 1 is a block diagram showing an embodiment of duplicated equipment according to the present invention.

FIG. 1 shows an embodiment of duplicated equipment according to the present invention. Referring to FIG. 1, main equipment 1, for example, a call processor in a time division exchange includes a speech path switch and a microprocessor for controlling the speech path switch, and a pair of subordinate devices 2-1 and 2-2 make up a duplicated terminal controller such as a duplicated controller for a subscriber's circuit The main equipment 1 is connected to the subordinate devices 2-1 and 2-2 by a common communication line (namely, a data highway) 3. The data highway 3 is used not only for transferring data between the main equipment and the subordinate devices but also for sending an active-state/standby-state changeover signal from the main equipment to the subordinate devices. The subordinate devices 2-1 and 2-2 are provided with signal lines 4 and 5, respectively. When one of the subordinate devices 2-1 and 2-2 is used as an active device in accordance with the exchange signal from the main equipment, the subordinate device delivers a reset signal for putting the other subordinate device in the standby state, to one of the signal lines 4 and 5.

Usually, one of the subordinate devices 2-1 and 2-2 making up the duplicated subordinate equipment is used as an active device, and the other subordinate device is used as a standby device. However, both of the subordinate devices 2-1 and 2-2 may be put in the standby state. In this case, each subordinate device is required to have a function of self-switching the subordinate device in the standby state when the interruption of a clock signal or the disconnection at the communication line is detected.

According to the embodiment of FIG. 1, when a failure occurs at that portion of the communication line 3 which exists near the input part of the subordinate device 2-2 used as an active device, a changeover signal for putting the subordinate device 2-1 in the active state is sent from the main equipment 1 to the subordinate device 2-1, and the subordinate device 2-2 is automatically put in the standby state. Thus, it can be prevented to put both of the subordinate devices 2-1 and 2-2 in the active state.

Figure 2:
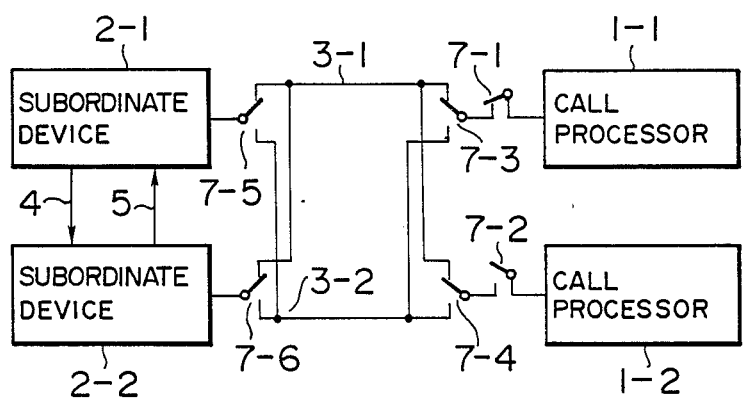
FIG. 2 is a block diagram showing another embodiment of duplicated equipment according to the present invention.

FIG. 2 shows another embodiment of duplicated equipment according to the present invention. Unlike the embodiment of FIG. 1, the present embodiment includes duplicated main equipment. Accordingly, the transmission system of the present embodiment is made up of a pair of data highways 3-1 and 3-2. Each of a pair of members making up a duplicated portion of the present embodiment can be used as an active or standby member, independently of the remaining duplicated portions. For example, when switches 7-1 to 7-6 are put in a connecting state shown in FIG. 2, a main device (for example, a call processor) 1-1 and the data highway 3-1 are used as active members, and only a desired one of the subordinate devices 2-1 and 2-2 can be used as an active device in accordance with a command from the main device 1-1. When the switch 7-1 is made open and the switch 7-2 is closed, another main device (for example, another call processor) 1-2 is used as the active device. Further, when the switches 7-3 and 7-4 are put in a connecting state opposite to that shown in FIG. 2, the data highway 3-2 is used as an active one. Each of the switches 7-1 to 7-6 is formed of an electronic device such as a logical gate circuit.

Figure 4:
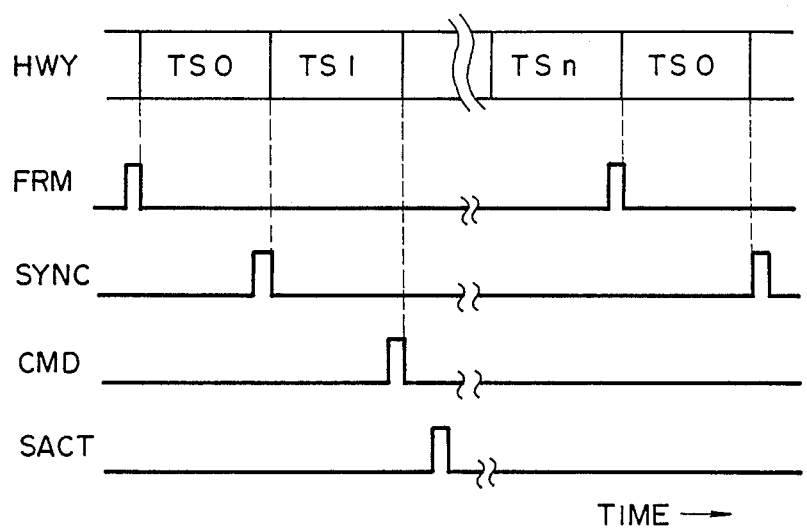
FIGS. 4, 5 and 6 are time charts for explaining the operation of the example of FIG. 3.
Figure 3:
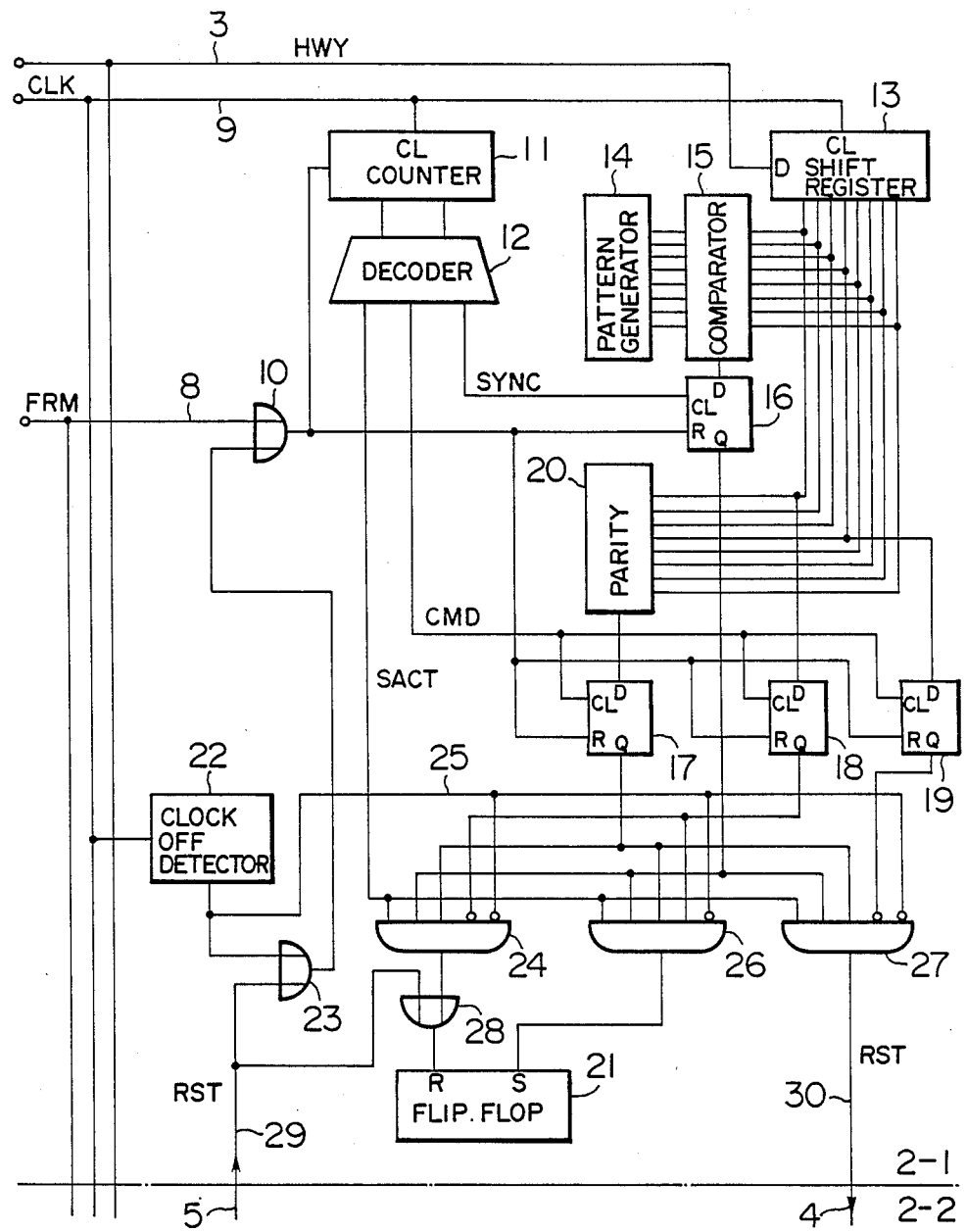
FIG. 3 is a circuit diagram showing an example of a circuit which is included in each of two subordinate devices shown in each of FIGS. 1 and 2, and which is used for resetting the other subordinate device.
Figure 5:
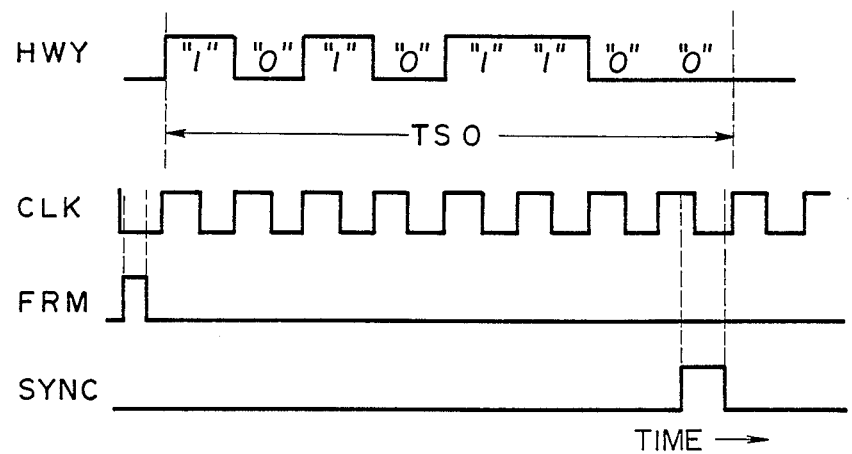

FIG. 3 is a circuit diagram showing an example of a circuit provided in each subordinate device for switching the subordinate device from an active state to a standby state, or from the standby state to the active state. However, only the above example of the subordinate device 2-1 is shown in FIG. 3 for brevity's sake. Referring to FIG. 3, the data highway 3 (namely, the communication line) connected to the main equipment (not shown) transmits a highway signal HWY having a format such as shown in FIG. 4. In FIG. 4, reference symbols TS0, TS1, . . . and TSn designate time slots. Each time slot is formed of a plurality of bits (for example, eight bits), as shown in FIG. 5, and one frame is composed of n time slots. As shown in FIG. 4, each pulse included in a frame signal FRM is a timing pulse for indicating the boundary between two frames, and is generated prior to the time slot TS0. The frame signal FRM is applied to a signal line 8 shown in FIG. 3. The frame signal FRM and a clock signal CLK are sent out from the main equipment. The bit signal of each time slot is synchronized with the clock signal CLK applied to a signal line 9. A time relation between the bit signal and the clock signal is shown in FIG. 5. In this case, the bit signal of the time slot TS0 is an NRZ (non return to zero) signal formed of an information bit train "10101100". The clock signal CLK is a clock pulse train for indicating the boundary between adjacent information bits, and the leading edge of each clock pulse indicates the leading edge of an information bit. Referring back to FIG. 3, a counter 11 is a resetable counter for counting up the clock pulses. When a frame pulse FRM is applied to the reset terminal R of the counter 11 through an OR gate 10, all the bits of the counter 11 are set to "0". Then, the counter 11 counts up clock pulses generated in one frame. As shown in FIG. 4 and FIG. 5 which includes an enlarged view of the time slot TS0, the frame pulse FRM is generated prior to the beginning of the time slot TS0 so that the frame pulse does not overlap with the clock pulse. Thus, the counter 11 is reset immediately before the time slot TS0, and counts up the clock pulses corresponding to the beginning of the time slot TS0 and the following clock pulses. Output values of the counter 11 are decoded by a decoder 12, to generate timing pulses SYNC, CMD and SACT which are used in various circuit parts of FIG. 3.

A shift register 13 has a plurality of stages, the number of which is equal to the number of information bits contained in one time slot. In the present example, the shift register 13 holds eight bits. The information bits on the data highway 3 are supplied to the data terminal D of the shift register 13, and are successively shifted by the clock signal CLK supplied to the clock terminal CL of the shift register 13.

The time slot TS0 of the highway signal HWY having a frame structure contains a fixed bit pattern for identifying a frame period. As shown in FIG. 5, when eight clock pulses have been received by the counter 11 after the generation of the frame pulse, the synchronizing pulse SYNC is delivered from the decoder 12. In more detail, in the present example, the counter 11 and the shift register 13 are driven by the leading edge of each clock pulse, and the synchronizing pulse SYNC is delivered after the leading edge of the eighth clock pulse from the beginning of the time slot TS0. At this time, the fixed bit pattern contained in the time slot TS0 (namely, the bit train "10101100) is set in the shift register 13. A pattern generator 14 delivers the fixed bit pattern, in parallel. A comparator 15 compares the fixed bit pattern from the pattern generator 14, with the contents of the shift register 13. When the contents of the shift register 13 agree with the fixed bit pattern from the pattern generator 14, the output of the comparator 15 is applied to the data terminal D of a D flip-flop 16, and is latched in response to a frame synchronization pulse SYNC applied to the clock terminal CL of the flip-flop 16. In other words, the flip-flop 16 is set when the frame synchronization is ensured.

Figure 6:
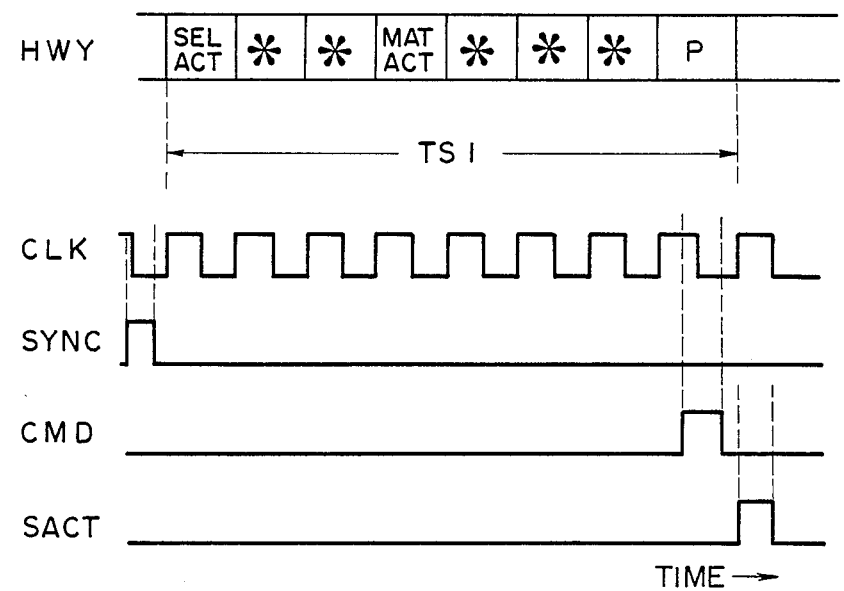

Further, in the present example, information on the changeover of each subordinate device from an active state to a standby state or from the standby state to the active state is contained in the time slot TS1, and the format of the above information is shown in FIG. 6. Referring to FIG. 6, the first bit of the time slot TS1 specifies the active state of one subordinate device (SEL) 2-1, and the fourth bit specifies the active state of the other subordinate device (MATE) 2-2. The eighth bit P is a parity bit for all of the eight bits of the time slot TS1 The remaining bits of the time slot TS1 are not used in the present example, but may be used in actual equipment, to set a desired state of the subordinate device 2-1. Similarly to the operation concerning the time slot TS0, a parity check for the time slot TS1 is performed by a parity circuit 20, and the result of the parity check is latched by a D flip-flop 17 in response to the pulse CMD having the timing shown in FIG. 6. In other words, the set state of the flip-flop 17 indicates that no error is found in the parity check. Further, the logical values of the first and fourth bits of the time slot TS1 are set in the D flip-flops 18 and 19, respectively, by the timing pulse CMD.

An RS flip-flop 21 specifies one of the active and standby states of the subordinate device 2-1, and the output of the flip-flop 21 is sent to various circuits which are not shown in FIG. 3 but are required to know which of the active and standby states of the subordinate device 2-1 has been specified.

Further, a clock off detector 22 inspects the clock signal CLK on a signal line 9. When the clock signal is interrupted, an output line 25 of the clock off detector 22 is put to a level "1". Conditions on the input side of an AND gate 26 which are necessary for setting the flip-flop 21, are given by the following equation:

(the set state of the flip flop 21) = (the set state of the flip-flop 16)  (1)

(the set state of the flip-flop 17) (the set state of the flip-flop 18)

("0" output of the clock off detector 22)

where the sign  indicates the logical product (that is, "AND"). The above conditions are satisfied in a case where the frame synchronization is ensured, no error is found in the parity check for the time slot TS1, the subordinate device 2-1 is specified as an active device, and the clock signal is normally supplied to the subordinate device 2-1.

Further, the flip-flop 21 can be reset in two conditions. In the first case where the frame synchronization is ensured, no error is found in the parity check for the time slot TS1, and the subordinate device 2-1 is specified as a standby device, the flip-flop 21 is reset by the output of an AND gate 24 which is supplied to the reset terminal R of the flip-flop 21 through an OR gate 28. In the second case, when a reset signal RST is supplied from the subordinate device 2-2 to the reset terminal R of the flip-flop 21 through a signal line 29 and the OR gate 28, the flip-flop 21 is reset.

Further, in a case where the frame synchronization is ensured, no error is found in the parity check for the time slot TS1, and the subordinate device 2-2 is specified as the standby device, a reset signal for the subordinate device 2-2 is delivered from an AND gate 27 to a signal line 30.

The reset and set signals for the flip-flop 21 and the reset signal for the subordinate device 2-2 are delivered from the AND gates 24, 26 and 27, respectively, by applying the timing pulse SACT which is generated at a time shown in FIG. 6, to these AND gates 24, 26 and 27 after the flip-flops 16 to 19 have latched their inputs in response to the timing pulses SYNC and CMD from the decoder 12.

In the present example, an active-state/standby-state changeover signal sent by the data highway 3 changes each of the subordinate devices 2-1 and 2-2 from an active state to a standby state or from the standby state to the active state. Further, in a case where one of the subordinate devices 2-1 or 2-2 does not receive the clock signal because of the breaking of the communication line (namely, communication cable) or the separation of a connector from a predetermined member, and is kept at an active state since the main equipment cannot change the state of the above subordinate device, this subordinate device can be put in a standby state by the reset signal from the other subordinate device.

Further, when the clock signal CLK is interrupted, the counter 11 and the D flip-flops 16 to 19 are reset by the output of the clock off detector 22. However, the state of the RS flip-flop 21 is not changed by the interruption of the clock signal. This is because, in a case where both of the subordinate devices 2-1 and 2-2 fail to perform a normal operation for reasons such as the interruption of the clock signal, the presently active device has to take the initiative in various maintenance procedures, that is, it is not allowed to put both of the subordinate devices in the standby state.

I claim:

1. Duplicated equipment comprising a main device, a pair of subordinate devices connected to each other via a reset line and means including a communication line for transferring information between the main device and each of the subordinate devices and for sending a changeover signal from the main device to the subordinate devices to put one and the other of the subordinate devices in an active state and a standby state, respectively, wherein each one of the subordinate devices includes means for putting the other subordinate device in the standby state via said reset line when the one subordinate device is put in the active state in accordance with a changeover signal received from the main device through said communication line.

2. Duplicated equipment according to claim 1, wherein each of the subordinate devices includes means for detecting a disconnection between said subordinate device and the communication line, and means for putting said subordinate device in the standby state when said detecting means detects said disconnection.

3. Duplicated equipment according to claim 1, wherein said communication line includes lines for sending a clock signal and frame pulse from said main device to each of said subordinate devices, and said means for putting the other subordinate device in the standby state includes first means for detecting said changeover signal using said clock signal and said frame pulse, parity check means for parity checking said changeover signal, and a logic circuit responsive to output signals of said first means and said parity check means and a reset signal from said other subordinate device for outputting a signal for putting said one subordinate device in an active or standby state.

4. Duplicated equipment according to claim 3, wherein each of said subordinate devices comprises a detector means for inspecting said clock signal and for stopping operation of said logic circuit when it is detected that said clock signal is interrupted.

5. Duplicated equipment according to claim 1, wherein said putting means comprises:
means connected to said communication line for detecting the changeover signal from the main device,
means for putting the one subordinate device in the active state and for outputting a reset signal to said reset line means in response to the detection of said changeover signal when he one subordinate device is in the standby state, and
means for putting the one subordinate device in the standby state in response to a reset signal received from the other subordinate device.

* * * * *